(12) United States Patent
Couturier et al.

(10) Patent No.: US 7,289,457 B2
(45) Date of Patent: Oct. 30, 2007

(54) SIGNALING ROUTER FOR SETTING UP MULTI-PARTY MULTIMEDIA SESSIONS

(75) Inventors: Alban Couturier, Chatillon (FR); François-Xavier Guitton, Saint Jean de Boiseau (FR); Alberto Conte, Paris (FR); Caroline Diquelou, Orvault (FR)

(73) Assignee: Alcatel, Paris (FR)

(*) Notice: Subject to any disclaimer, the term of this patent is extended or adjusted under 35 U.S.C. 154(b) by 1016 days.

(21) Appl. No.: 10/170,587

(22) Filed: Jun. 14, 2002

(65) Prior Publication Data

US 2002/0191623 A1    Dec. 19, 2002

(30) Foreign Application Priority Data

Jun. 15, 2001   (FR)   ................................. 01 07919

(51) Int. Cl.
   *H04L 12/16*   (2006.01)
   *H04L 12/66*   (2006.01)
   *H04J 3/26*    (2006.01)

(52) U.S. Cl. ........................ 370/261; 370/352; 370/432

(58) Field of Classification Search ............... None
See application file for complete search history.

(56) References Cited

U.S. PATENT DOCUMENTS

| 6,128,305 | A  | * | 10/2000 | Hjalmtysson et al. | ........ | 370/410 |
| 6,577,622 | B1 | * | 6/2003  | Schuster et al. | ............ | 370/352 |
| 2002/0129236 | A1 | * | 9/2002 | Nuutinen | ..................... | 713/151 |

FOREIGN PATENT DOCUMENTS

WO         WO 01 03401 A        1/2001

OTHER PUBLICATIONS

M. Handley et al., "RFC 2543—SIP: Session Initiation Protocol", Mar. 1999, pp. 1-6, 58, and 121.*

* cited by examiner

*Primary Examiner*—Steven Nguyen
(74) *Attorney, Agent, or Firm*—Sughrue Mion Pllc.

(57) ABSTRACT

A signaling router which receives messages coming from terminals or from other signaling routers, correlates a new message with a previously received message, and forwards the new message to a signaling router associated with the previously received message is presented.

5 Claims, 1 Drawing Sheet

FIG_1
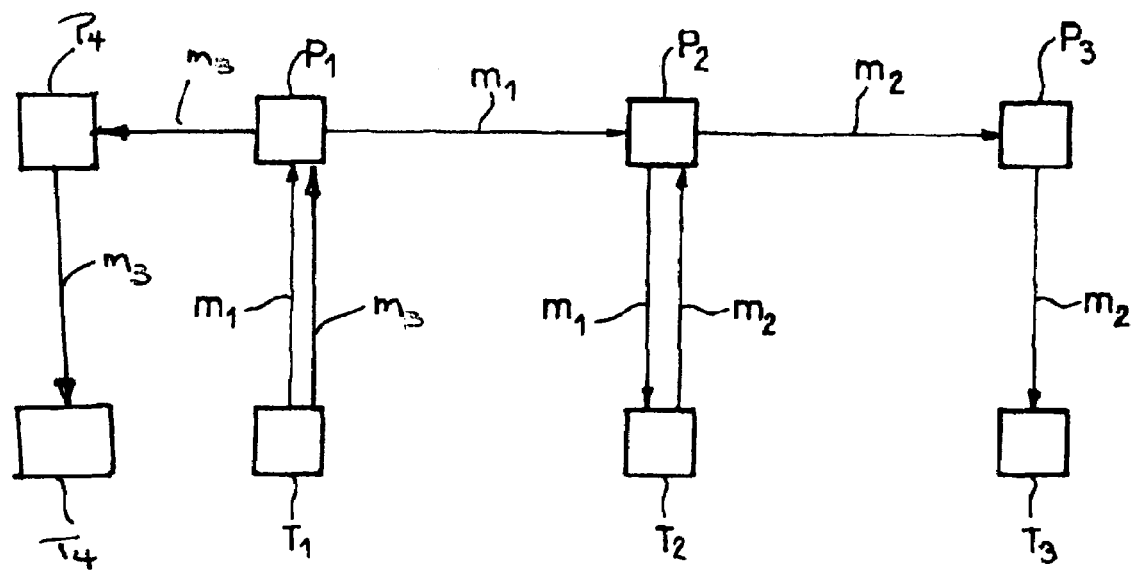
FIG_2
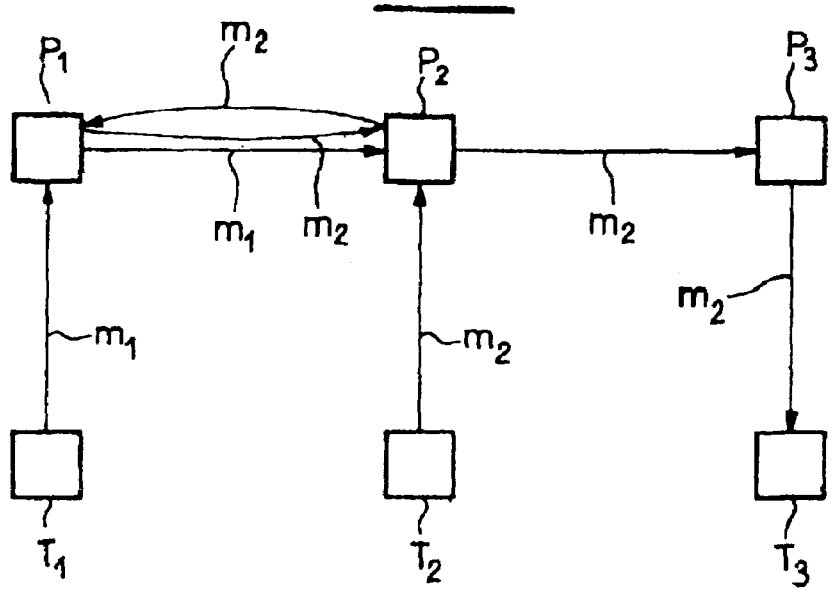

SIGNALING ROUTER FOR SETTING UP MULTI-PARTY MULTIMEDIA SESSIONS

The present invention relates to the field of telecommunications, and more precisely to transmitting multimedia streams (in particular audio and video) over an Internet type data network, i.e. a network based on the Internet protocol (IP) family of protocols.

More precisely, the invention applies to setting up multi-party multimedia sessions over such data networks.

BACKGROUND OF THE INVENTION

The mechanisms for transmitting multimedia streams over data networks are commonly referred to as voice over IP mechanisms. A well-known example for transmitting audio streams over a data network is referred to specifically by the acronym VoIP (for Voice over IP). Although applicable in particular to voice and to telephone applications, the same mechanisms can be used for any other multimedia stream (specifically for video). The terminology must therefore be understood in a broad sense.

In a manner similar to that employed in the context of a conventional switched telephone network, a multimedia session over IP can be subdivided into two mechanisms: a signaling mechanism and a mechanism for transmitting the multimedia streams.

The object of the signaling mechanism is specifically to enable the parties of the session to negotiate so as to enable the multimedia streams to be transmitted.

An example of a signaling protocol is the session initiation protocol (SIP) as defined in request for comments (RFC) 2543 of the Internet engineering task force (IETF).

In that protocol, terminals can interchange messages in order to create, monitor, or terminate a multimedia session. The messages pass via signaling routers, conventionally referred to as "proxies".

Each network terminal is associated with a signaling router or proxy that is in charge of a portion of the network.

FIG. 1 shows three terminals $T_1$, $T_2$, $T_3$. These terminals are associated with three signaling routers respectively $P_1$, $P_2$, and $P_3$.

When terminal $T_1$ seeks to initiate a multimedia session with terminal $T_2$, it sends a message $m_1$ to its own signaling router $P_1$. That signaling router $P_1$ forwards the message (possibly after modifying it) to signaling router $P_2$ using a conventional shortest-path technique. The signaling router $P_2$ then forwards it to terminal $T_2$.

The message $m_1$ contains the information that is needed for enabling the multimedia stream to be set up. By way of example, the information may include the number of the port to be used on the terminal $T_1$.

After terminal $T_2$ has replied by means of another message, the multimedia stream can be set up.

That model nevertheless raises a problem for multimedia sessions that have at least three parties, commonly referred to as "conferences", and in particular for conferences involving more than three parties.

Returning to the example shown in FIG. 1, terminal $T_2$ seeks to invite terminal $T_3$ to join the same multimedia session so as to set up a three-party conference. In the same manner as before, terminal $T_2$ sends a message $m_2$ to the signaling router $P_2$ with which it is associated. The router forwards the message to the signaling router $P_3$ which in turn forwards it to terminal $T_3$.

In the same manner, terminal $T_1$ invites terminal $T_4$ to join the same multimedia session, by sending a message $m_3$ to signaling router $P_1$ which forwards it to signaling router $P_4$ associated with terminal $T_4$.

Nevertheless, at no time can all three messages ($m_1$ and $m_3$ coming from terminal $T_1$ and $m_2$ coming from terminal $T_2$) be correlated by any one of the signaling routers concerned.

It follows that the network is unaware that a four-party conference is under way. So far as the network is concerned, there are at least two distinct multimedia sessions in progress, and the fact that together they constitute a four-party conference is known only to the terminals.

Unfortunately, certain special messages need to be implemented once a multimedia session involves more than two parties. In particular, for the audio stream, it can be necessary to make use of a conference bridge for mixing streams. For example, in order to enable terminal $T_3$ to hear simultaneously the audio signals coming from terminals $T_1$, $T_2$, and $T_4$ (assuming that the users of these three terminals are all speaking at once), it is necessary to mix the signals.

To ensure that special mechanisms can be implemented by the network, it is necessary for some element of the network to be aware that such a conference is in progress.

OBJECT AND BRIEF SUMMARY OF THE INVENTION

The object of the present invention is to solve this technical problem. To do this, the invention provides a signaling router having means for receiving messages coming from terminals or from other signaling routers, wherein the router further comprises means for correlating a new message with a previously received message, and for forwarding said new message to a signaling router associated with said previously received message.

In an embodiment of the invention, the correlation is established by means of a conference identifier contained in said message.

BRIEF DESCRIPTION OF THE DRAWING

The invention and its advantages are described below with reference to the accompanying figures.

FIG. 1, commented on above, shows a data network enabling multimedia streams to be transmitted in accordance with the prior art.

FIG. 2 shows a data network in accordance with the invention.

MORE DETAILED DESCRIPTION

FIG. 2 shows three terminals $T_1$, $T_2$, and $T_3$ respectively associated with three signaling routers $P_1$, $P_2$, and $P_3$.

As described above, these signaling routers possess means for receiving messages coming either from terminals or from other signaling routers.

It is assumed that terminal $T_1$ seeks to open a multimedia session with terminal $T_2$. It therefore sends a message $m_1$ to the signaling router with which it is associated, i.e. $P_1$, which in turn forwards the message to signaling router $P_2$ which finally forwards it to terminal $T_2$.

In an embodiment of the invention, the signaling routers possess memory enabling conference identifiers to be put into correspondence with signaling routers. These conference identifiers can be contained in the received message.

When session initiation protocol (SIP) is used for conveying the messages, these conference identifiers can be constituted by the "call ID" field, for example.

When the router $P_2$ receives the message coming from the router $P_1$, it verifies whether it does not already have a record in said memory containing a conference identifier equal to that of the received message. If no such record exists, then it adds a record in which it puts the value of said conference identifier into correspondence with the signaling router from which the message comes, i.e. signaling router $P_1$.

The signaling router $P_1$ can be considered (by signaling router $P_2$) as being associated with the conference that corresponds to the signaling identifier.

When the terminal $T_2$ seeks to invite terminal $T_3$ into the conference, it sends a message $m_2$ to the signaling router with which it is associated, i.e. signaling router $P_2$. This message contains a conference identifier identical to the identifier mentioned above.

On receiving the message, the signaling router $P_2$ is in a position to correlate this message with the message previously received from the signaling router $P_1$ (since they have the same conference identifier). This correlation can be performed as mentioned previously, by means of a memory putting conference identifiers into correspondence with associated signaling routers.

The signaling router $P_2$ thus considers that the signaling router $P_1$ is the signaling router associated with this new message, and forwards the message to signaling router $P_1$.

As a result, signaling router $P_1$ is aware that a three-party conference is concerned, as contrasted with two two-party multimedia sessions. It is then in a position to implement appropriate mechanisms.

When the multimedia session in question involves transmitting audio streams, the signaling router $P_1$ can control a conference bridge and tell the various terminals involved, $T_1$, $T_2$, and $T_3$ to make connections with said conference bridge.

By way of example, the conference bridge is in charge of mixing the streams. When the users of two terminals speak simultaneously, stream mixing enables the user of the third terminal to hear both voices simultaneously.

The signaling router $P_1$ can then send the message $m_2$ to the signaling router $P_2$ which in turn forwards it to the signaling router $P_3$. The message can then be forwarded to the invited terminal, i.e. to terminal $T_3$.

Conventionally, signaling routers possess means for detecting loops: on receiving a message that has already been received, the message is automatically destroyed.

In a particular embodiment of the invention, it is nevertheless appropriate in this case to modify the loop detection means so that the message is not destroyed the second time it is presented.

It is possible to conserve a loop detection mechanism designed to destroy messages that are received for at least a third time.

The invention claimed is:

1. A signaling router comprising:
   means for receiving messages coming from terminals or from other signaling routers;
   means for correlating a new message with a previously received message, and for forwarding said new message to a signaling router associated with said previously received message; and
   loop detection means for deleting a message only after it has been received by the signaling router more than two times.

2. A signaling router according to claim 1, in which the correlation is established using a conference identifier contained in said new message and said previously received message.

3. A signaling router according to claim 1, further comprising means for, when the new message comes from another signaling router and when it is not correlated with a previously received message, considering that said other signaling router is the signaling router associated with said new message.

4. A signaling router according to claim 1, in which messages comply with the SIP protocol, and conference identifiers are constituted by call ID fields of said messages.

5. A signaling router according to claim 1, further comprising means for controlling a conference point.

* * * * *